(12) United States Patent
Moon et al.

(10) Patent No.: US 10,467,781 B1
(45) Date of Patent: Nov. 5, 2019

(54) INFORMATION ENVIRONMENT MAP

(71) Applicant: DOMO, INC., American Fork, UT (US)

(72) Inventors: Shaun Richard Moon, Salt Lake City, UT (US); Alan Adams Winters, Lindon, UT (US); Benjamin Green, Murray, UT (US)

(73) Assignee: DOMO, Inc., American Fork, UT (US)

( * ) Notice: Subject to any disclaimer, the term of this patent is extended or adjusted under 35 U.S.C. 154(b) by 353 days.

(21) Appl. No.: 15/083,038

(22) Filed: Mar. 28, 2016

Related U.S. Application Data

(63) Continuation of application No. 14/607,761, filed on Jan. 28, 2015, now Pat. No. 9,299,170.

(60) Provisional application No. 61/932,615, filed on Jan. 28, 2014.

(51) Int. Cl.
| | |
|---|---|
| *G09G 5/00* | (2006.01) |
| *G06T 17/05* | (2011.01) |
| *G09G 5/02* | (2006.01) |
| *G06T 11/00* | (2006.01) |
| *G06T 11/20* | (2006.01) |
| *G06F 3/0484* | (2013.01) |
| *G06T 11/60* | (2006.01) |

(52) U.S. Cl.
CPC .......... *G06T 11/206* (2013.01); *G06F 3/0484* (2013.01); *G06T 11/001* (2013.01); *G06T 11/60* (2013.01); *G06T 2200/24* (2013.01)

(58) Field of Classification Search
CPC ... G06T 11/206; G06T 17/05; G09G 2340/12; G06F 3/0481
See application file for complete search history.

(56) References Cited

U.S. PATENT DOCUMENTS

| | | | | |
|---|---|---|---|---|
| 6,262,662 | B1* | 7/2001 | Back | G06K 7/0008 340/4.1 |
| 8,730,264 | B1* | 5/2014 | Cornell | G06F 3/14 345/419 |
| 2002/0168084 | A1* | 11/2002 | Trajkovic | G06K 9/00778 382/100 |
| 2003/0061211 | A1* | 3/2003 | Shultz | G06F 17/3087 |
| 2007/0188494 | A1* | 8/2007 | Agutter | G06F 17/30554 345/440 |
| 2013/0127862 | A1* | 5/2013 | Grewal | G06T 11/206 345/440 |
| 2016/0210357 | A1* | 7/2016 | Wohltman | G06F 17/30241 |

* cited by examiner

*Primary Examiner* — Tapas Mazumder
(74) *Attorney, Agent, or Firm* — Stoel Rives LLP; Joseph J. Hawkins

(57) ABSTRACT

Information is presented on a map that resembles a city map, with related information grouped into distinct "neighborhoods." Such a display scheme takes advantage of spatial cognition in order to provide an organizational and presentational scheme by which users can more easily remember where to look for and find the right information. Metadata, notifications, and/or other auxiliary information can be presented alongside or superimposed upon the data itself.

20 Claims, 20 Drawing Sheets

INFORMATION ENVIRONMENT MAP

CROSS-REFERENCE TO RELATED APPLICATION

The present application claims priority from U.S. Provisional Application Ser. No. 61/932,615 for "Information Environment Map," filed Jan. 28, 2014, which is incorporated by reference herein in its entirety.

TECHNICAL FIELD

The present invention relates to computer-implemented mechanisms for organizing and presenting large amounts of information.

DESCRIPTION OF THE RELATED ART

In any computer-driven system that stores, organizes, and presents large amounts of information, it can be a challenge to find needed information on demand and to present information in a manner that facilitates ease of navigation by a user.

Many computer-driven navigation schemes apply hierarchical structures and/or keyword search-based mechanisms for finding, accessing, and displaying data. However, hierarchical navigation structures can be problematic because it is often difficult for a user to remember or determine where specific desired information is located within the hierarchy. Search-based mechanisms often do not provide sufficient context for data items, and also can fail when keywords return too many or too few results.

Another problem with many existing computer-driven systems for organizing information is that they separate metadata (i.e. information about data, notifications, and/or the like) from actual data. For example, in many applications, such information is presented to users in a special area or page that is entirely separate from the area in which the data appears on the notification is triggered.

SUMMARY

Various embodiments of the present invention address the above-described issues by providing computerized systems and methods whereby information is presented on a map that resembles a city map, with related information grouped into distinct "neighborhoods." Such a computerized display scheme takes advantage of spatial cognition in order to provide an organizational and presentational scheme by which users can more easily remember where to look for and find the right information.

In addition, embodiments of the present invention provide computer-implemented mechanisms by which metadata, notifications, and/or other auxiliary information can be presented alongside or superimposed upon the data itself.

The techniques of the present invention provide several advantages over prior art schemes for organizing and displaying information. For example:

- Maps provide an intuitively understandable spatial metaphor that many users find easier to interpret and navigate than competing schemes such as affinity diagrams.
- A very large amount of information can be presented understandably in a compact space.
- Relationships between higher-level organizations are easier to see.
- The representation is scalable. A user can zoom in or out to see more information at different levels of detail.
- Maps are useful for presenting comparisons.

One skilled in the art will recognize that various embodiments of the present invention provide additional advantages not listed here.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope. In particular the example screen shots depict one possible layout for an information display; other layouts are possible.

DETAILED DESCRIPTION OF THE EMBODIMENTS

Various embodiments of the present invention provide interactive information displays on electronic devices, by which information is organized on a map that resembles a city map, with related information grouped into distinct "neighborhoods" and/or other regions. Several features of the invention reinforce the visual metaphor of a city map, as described and depicted herein.

The system of the present invention thus takes advantage of users' innate spatial reasoning by organizing information on a map. The map can be of any desired dimension, such as two-dimensional or three-dimensional. Distinct neighborhoods collect highly related information. Different types of information are represented as different kinds of graphics, such as a dot, building, and the like.

In at least one embodiment, the information displays provided by the system are data visualizations showing company metrics, although they may represent any other type of information. In general, the more pieces of information a neighborhood contains, the denser the representative graphics. Relationships between neighborhoods are represented through proximity; for example, categories of information that are closely related appear close together on the map.

System Architecture

According to various embodiments, the system can be implemented on any electronic device equipped to receive, store, and present information. Such an electronic device may be, for example, a desktop computer, laptop computer, smartphone, tablet computer, or the like.

Although the system is described herein in connection with an implementation in a computer, one skilled in the art will recognize that the techniques described herein can be implemented in other contexts, and indeed in any suitable device capable of receiving and/or processing user input. Accordingly, the following description is intended to illustrate various embodiments by way of example, rather than to limit scope.

Figure 1A:
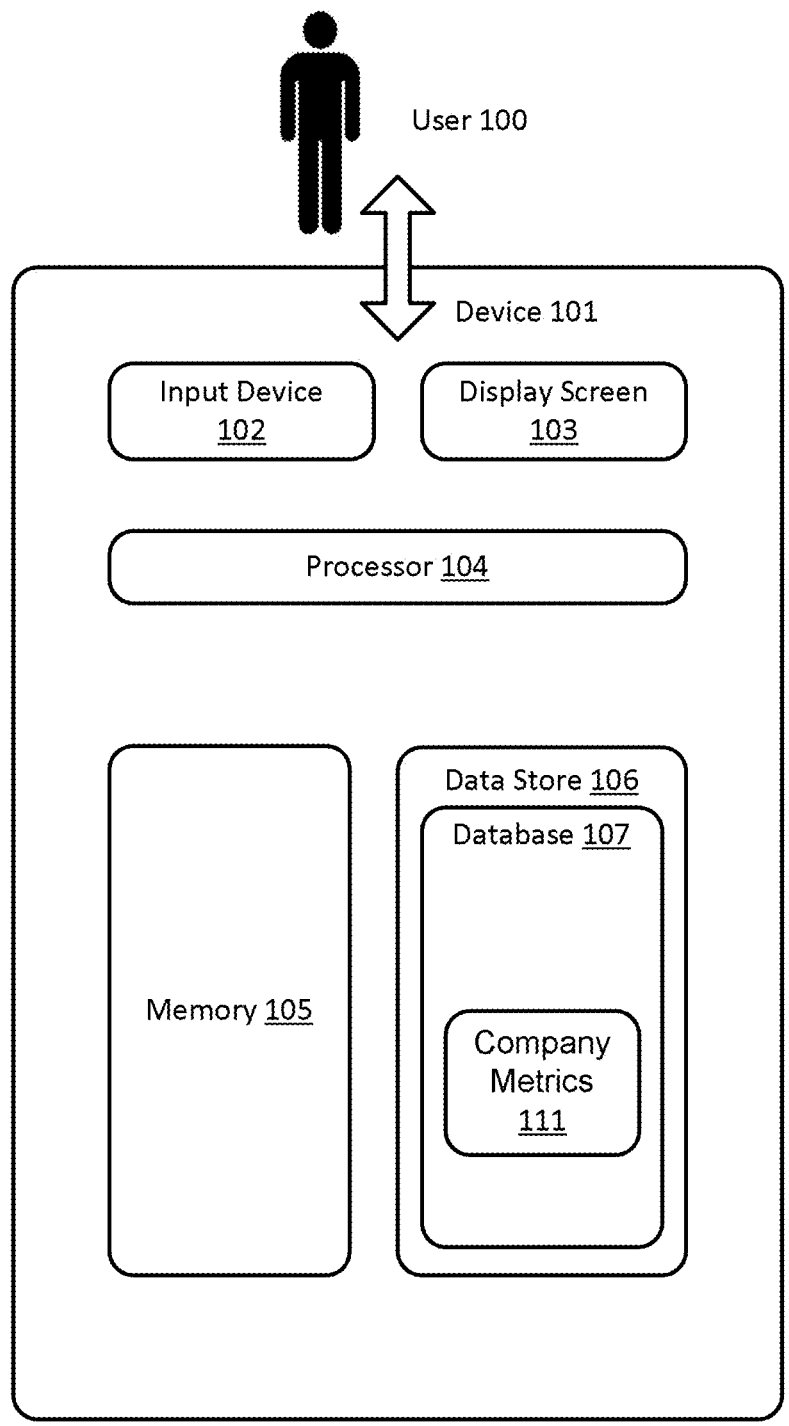
FIG. 1A is a block diagram depicting a hardware architecture according to one embodiment.

Referring now to FIG. 1A, there is shown a block diagram depicting a hardware architecture for practicing the described system, according to one embodiment. Such an architecture can be used, for example, for implementing the techniques of the system in a computer or other device 101. Device 101 may be any electronic device equipped to receive, store, and/or present information, and to receive user input in connect with such information.

In at least one embodiment, device 101 has a number of hardware components well known to those skilled in the art. Input device 102 can be any element that receives input from user 100, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech.

Data store 106 can be any magnetic, optical, or electronic storage device for data in digital form; examples include flash memory, magnetic hard drive, CD-ROM, DVD-ROM, or the like. In at least one embodiment, data store 106 stores information which may include one or more databases, referred to collectively as a database 107, that can be utilized and/or displayed according to the techniques described below. In another embodiment, database 107 can be stored elsewhere, and information may retrieved from database 107 by device 101 when needed for presentation to user 100.

Database 107 may include one or more data sets, which may be used for a variety of purposes and may include a wide variety of files, metadata, and/or other data. In at least one embodiment, database 107 may include company metrics 111 and/or any other data to be represented using the information environment map described herein.

Display screen 103 can be any element that graphically displays information such as items from database 107 and/or the results of steps performed on such items to provide information useful to a user. Such output may include, for example, raw data, data visualizations, navigational elements, queries requesting confirmation and/or parameters for information identification, display, or presentation, or the like. In at least one embodiment where only some of the desired output is presented at a time, a dynamic control, such as a scrolling mechanism, may be available via input device 102 to change which information is currently displayed, and/or to alter the manner in which the information is displayed. Display screen 103 can be two-dimensional, or it can display data in three-dimensional form, using any suitable technique for 3D presentation.

Information displayed on display screen 103 may include, for example, data in text and/or graphical form. More particularly, in at least one embodiment, display screen 103 is the primary output mechanism by which the information environment map described herein is provided to user 100. As described in more detail herein, a geographic metaphor can thereby be used to convey and organize elements of information, as well as relationships among such elements. In at least one embodiment, labels accompany various areas of the map, or can be displayed when user 100 taps on or clicks on an area of the map, or causes an onscreen cursor to hover over an area of the map.

Processor 104 can be a conventional microprocessor for performing operations on data under the direction of software, according to well-known techniques. Memory 105 can be random-access memory, having a structure and architecture as are known in the art, for use by processor 104 in the course of running software.

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, via a cellular network, or by any other appropriate means. This communication with other electronic devices is provided as an example and is not necessary.

In at least one embodiment, data store 106 is detachable in the form of a CD-ROM, DVD, USB flash drive, hard drive, or the like. Database 107 can be entered from a source outside of device 101 into a data store 106 that is detachable, and later displayed after the data store 106 is connected to device 101. In another embodiment, data store 106 is fixed within device 101.

Figure 1B:
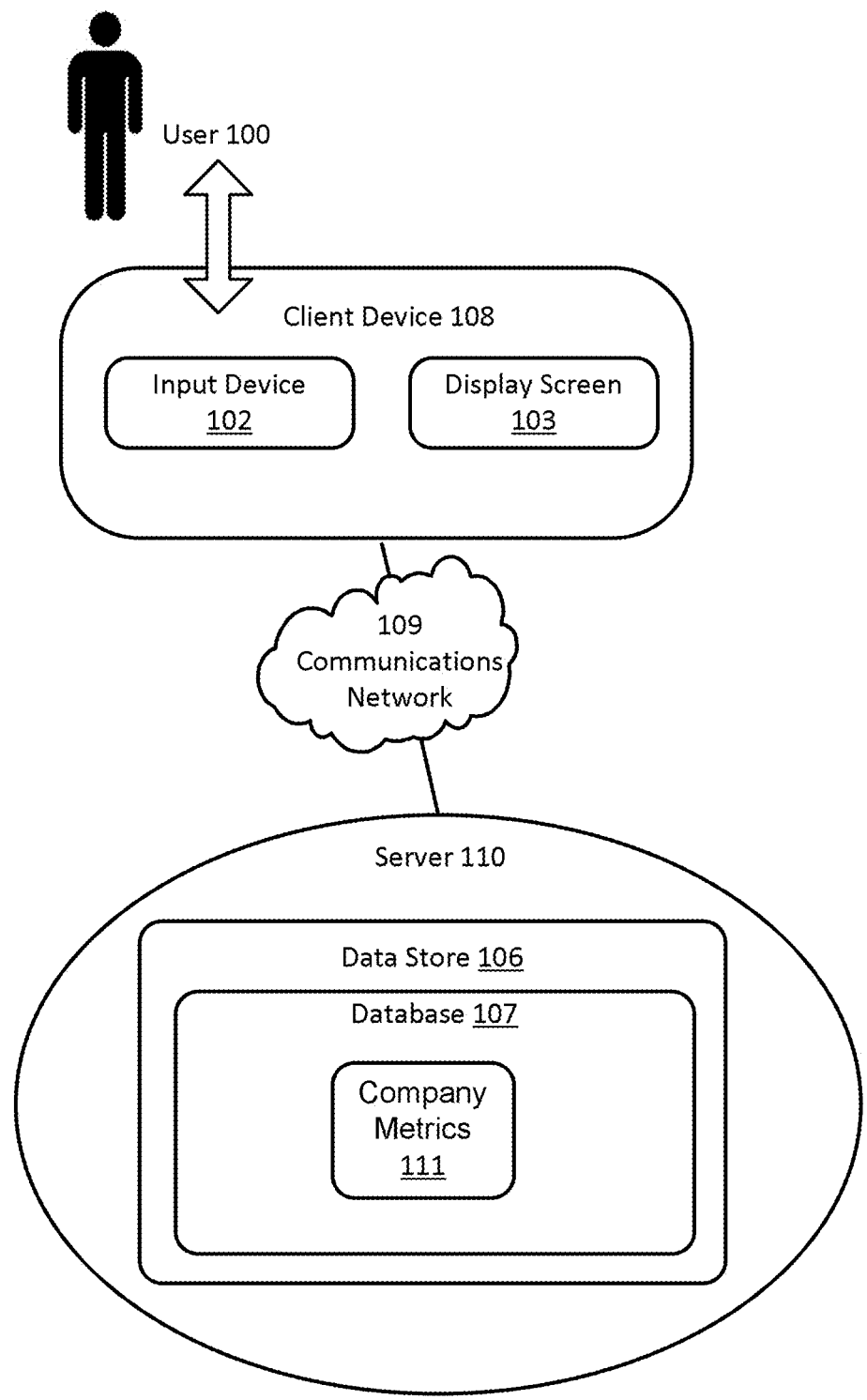
FIG. 1B is a block diagram depicting a hardware architecture in a client/server environment, according to one embodiment.

Referring now to FIG. 1B, there is shown a block diagram depicting a hardware architecture in a client/server environment, according to one embodiment. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. The information environment map described herein, using data derived from the database 107, can be presented as part of such web pages and/or other web-based resources, using known protocols and languages such as Hypertext Markup Language (HTML), Java, JavaScript, and the like.

Client device 108 can be any electronic device incorporating the input device 102 and/or display screen 103, such as a desktop computer, laptop computer, personal digital assistant (PDA), cellular telephone, smartphone, music player, handheld computer, tablet computer, kiosk, game system, or the like. Any suitable type of communications network 109, such as the Internet, can be used as the mechanism for transmitting data between client device 108 and server 110, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 109, and receives responses from server 110 containing the requested data.

In this implementation, server 110 is responsible for data storage and processing, and incorporates data store 106 for storing database 107. Server 110 may include additional components as needed for retrieving data and/or database 107 from data store 106 in response to requests from client device 108.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100. In at least one embodiment, an identifying label is also stored along with each data entry, to be displayed along with each data entry, for example as part of an information environment map.

In at least one embodiment, database 107 is organized in a file system within data store 106. Appropriate indexing can be provided to associate particular documents with particular quantitative data elements, reports, other documents, and/or the like. Database 107 may include any of a wide variety of data structures known in the database arts. As in FIG. 1A, database 107 may include one or more data sets, which may include company metrics 111 and/or other data (not shown).

Company metrics 111 and/or other data can be retrieved from the data store 106, or from any other source. Data store 106 may be client-based and/or server-based. In at least one embodiment, input device 102 is configured to receive data entries from user 100, to be added to data store 106. User 100 may provide such data entries via the hardware and software components described above according to means that are well known to those skilled in the art. Server 110 may be connected to several client devices 108 that are used by various individuals of the enterprise, and may thus store company metrics 111 from multiple users and/or multiple client devices 108. Company metrics 111 may be used to generate notifications to user 100, which may be transmitted via display screen 103 and/or one or more other output devices.

Display screen 103 can be any element that graphically displays information such as items from database 107 and/or the results of steps performed on such items to provide information useful to a user. Such output may include, for example, an information environment map as described below, as well as raw data, data visualizations, navigational elements, queries requesting confirmation and/or parameters for information identification, display, or presentation, or the like. In at least one embodiment where only some of the desired output is presented at a time, a dynamic control, such as a scrolling mechanism, may be available via input device 102 to change which information is currently displayed, and/or to alter the manner in which the information is displayed.

As described in connection with FIG. 1A, in at least one embodiment, display screen 103 is the primary output mechanism by which the information environment map described herein is provided to user 100. As described in more detail herein, a geographic metaphor can thereby be used to convey and organize elements of information, as well as relationships among such elements. In at least one embodiment, labels accompany various areas of the map, or can be displayed when user 100 taps on or clicks on an area of the map, or causes an onscreen cursor to hover over an area of the map.

Processor 104 can be a conventional microprocessor for use in an electronic device to perform operations on data under the direction of software, according to well-known techniques. Memory 105 can be random-access memory, having a structure and architecture as are known in the art, for use by processor 104 in the course of running software.

In one embodiment, the system can be implemented as software written in any suitable computer programming language, whether in a standalone or client/server architecture. Alternatively, it may be implemented and/or embedded in hardware.

In general, the data stored within data store 106 of FIG. 1A or FIG. 1B may include one or more pieces of data, each of which may be of any desired length and format. Thus, each piece of data may be a character string, integer, floating point number, or any other type of data, and may thus represent any information such as names, times, dates, currency amounts, percentages, fractions, physical dimensions, or any other data that may desirably be stored in a computer. As mentioned previously, data store 106 may include, for example, company metrics 111, although various embodiments provide mechanisms for presenting data of any suitable type.

Functional Architecture

Figure 2:
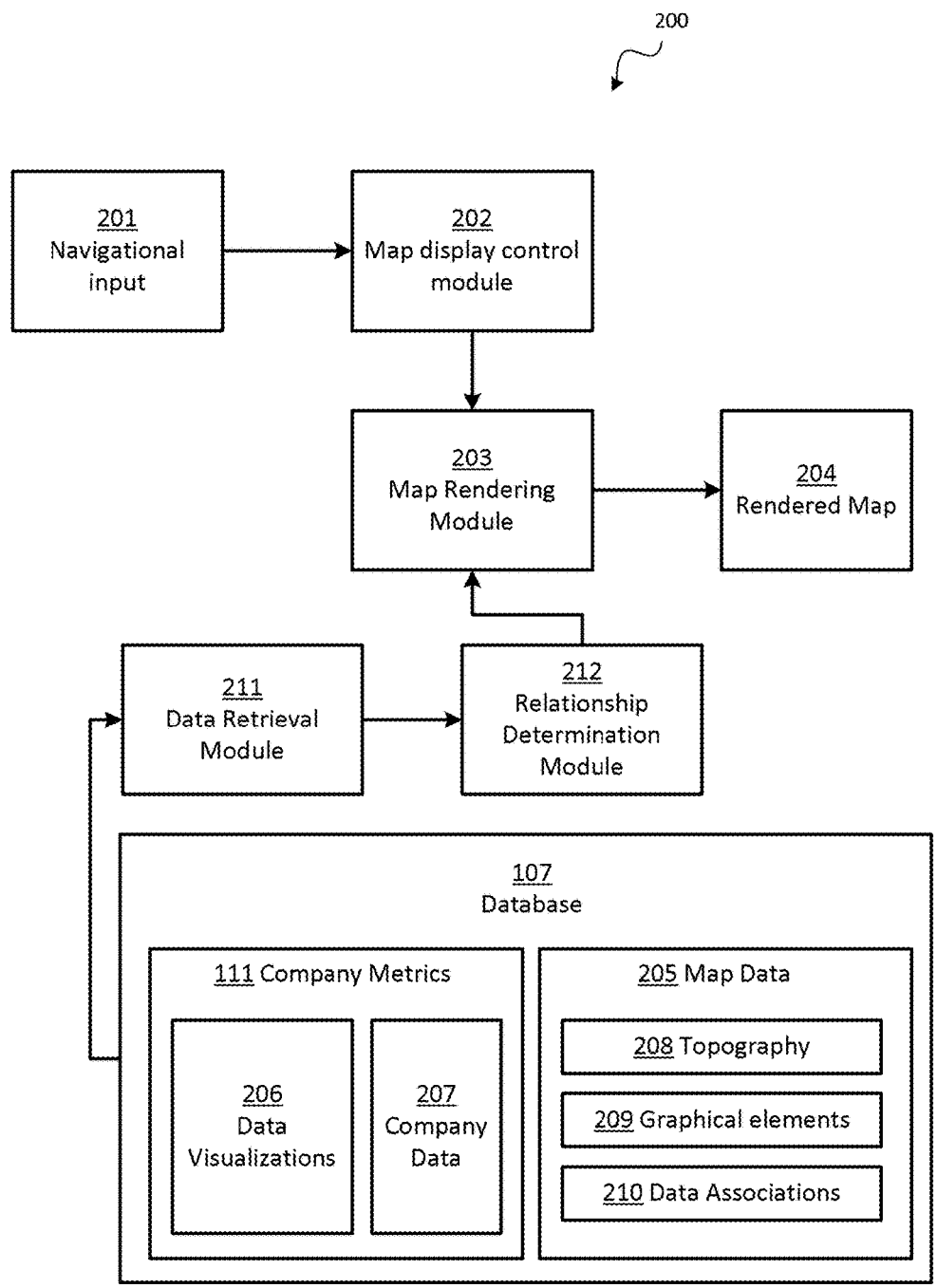
FIG. 2 is a block diagram depicting a functional architecture for a system for providing an information environment map, according to one embodiment.

Referring now to FIG. 2, there is shown a block diagram depicting a functional architecture for a system 200 for providing an information environment map, according to one embodiment. The functional architecture of FIG. 2 can be implemented using any suitable hardware architecture, such as for example those depicted in FIG. 1A or FIG. 1B. Various functional components depicted in FIG. 2 can be implemented using any suitable components (or combinations of components) of the hardware architecture, operating singly or in concert with one another. Components can be local or remote with respect to one another, and any suitable communications mechanism can be used for components to communicate and interact with one another. One skilled in the art will recognize, however, that the functional architecture of FIG. 2 is merely exemplary, and that the system described herein can be implemented in any other suitable functional architecture.

Data retrieval module 211 retrieves information from database 107 according to techniques described below. Relationship determination module 212 determines relationships among data elements, as described in more detail below. Map rendering module 203 uses information retrieved by module 211 from database 107, along with relationships determined by module 212, to generate a rendered map 204 that provides a framework for representing and interacting with data. Any suitable data from database 107 can be used in generating map 204. As shown in FIG. 2, such data can include, for example, company metrics 111 and map data 205. In this example, wherein map 204 is used to represent company metrics 111, company metrics 111 may include any information about the company, such as particular data visualizations 206 and/or company data 207. In other embodiments, wherein map 204 is used to represent other types of data, database 107 can include such other types of data. Map 204 can take the form of a city map, a state map, a regional map, a country map, or any other map that covers (or appears to cover) a geographical area at some defined scale of choice.

Map data 205 includes information to be used as the basis for the visual representation of the map 204. Such data may include, for example a topography 208 of the map (which may be, but need not be, based on a real-world geographical location), graphical elements 209 that can be displayed along with the map (such as symbols, lines, and/or the like), and data associations 210 that specify how elements of company metrics 111 should be associated with different locations on map 204. Map data 205 may include any other information that is useful in rendering map 204. In various embodiments, map data 205 can be stored according to any suitable organizational scheme, either as part of database 107 or as a separate functional component.

Database 107 can store company metrics 111, map data 205, and/or other data in any suitable form. As described above, database 107 may be located locally or remotely with respect to map rendering module 203; for example, database 107 may be located at a server, while map rendering module 203 may be client-based. Any suitable communications mechanism can be used for transferring relevant information from database 107 to map rendering module 203, including for example an HTTP request/response protocol or the like.

User 100 can interact in various ways with rendered map 204, for example to highlight certain regions, zoom in, move around, view additional information about selected regions, and/or the like. In at least one embodiment, system 200 receives navigational input 201 from user 100 to initiate such interactions. Such input 201 can be provided via any suitable input device 102, including those listed above in connection with FIGS. 1A and 1B. For example, in one embodiment, user 100 can interact with map 204 being displayed on a touch-sensitive screen by tapping, dragging, and/or otherwise interacting with the touch-sensitive screen. In other embodiments, a pointing device can be used to control a cursor that can be moved across map 204, and/or keyboard control can be used, and/or other mechanisms can be used. In at least one embodiment, map display control module 202 interprets such navigational input 201 and provides it to map rendering module 203 so that module 203 can re-rendering map 204 according to the new position, orientation, and/or the like. In addition, module 203 can superimpose or otherwise display additional information based on user input 201, such as pop-ups, visualizations, labels, text, and/or the like. As described in more detail below, text-based searching may also be provided to facilitate access to certain data elements within map 204.

Method

Figure 3:
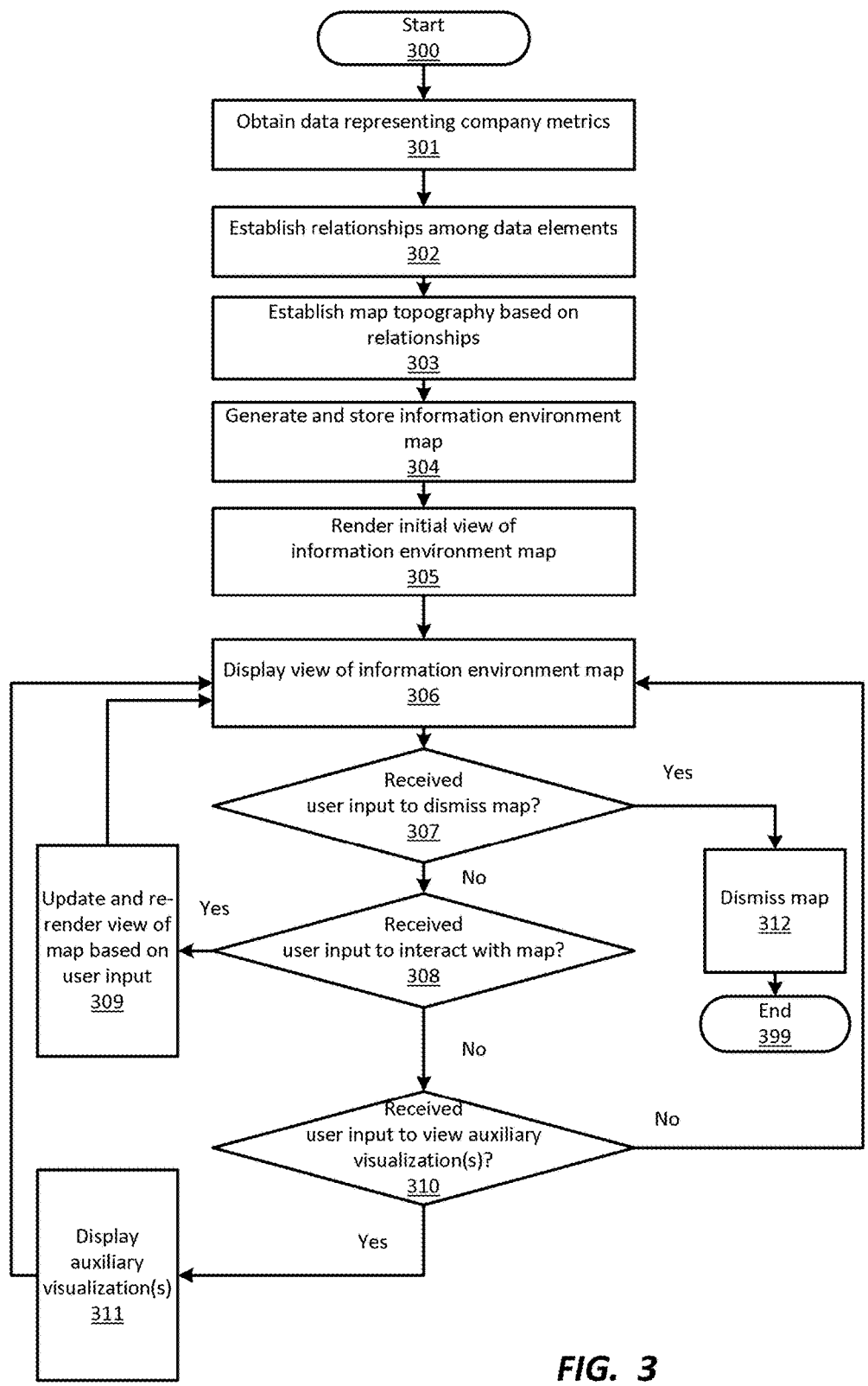
FIG. 3 is a flowchart depicting a method of providing an information environment map, according to one embodiment.

Referring now to FIG. 3, there is shown a flowchart depicting a method of providing an information environment map, according to one embodiment. In at least one embodiment, the method depicted in FIG. 3 can be performed using a system such as that depicted in FIG. 1A or 1B, and/or having a functional architecture such as that depicted in FIG. 2. However, one skilled in the art will recognize that the method of FIG. 3 can be implemented using systems having other architectures than those depicted in FIGS. 1A, 1B, and 2.

Data is obtained 301 representing company metrics 111 (or any other data elements that are to be represented in an information environment map 204). In at least one embodiment, this step is performed by retrieving data from database 107, although data can be received from any other suitable source, whether local or remote. Data obtained in step 301 may be raw data, or visualizations of quantitative data, or any combination thereof.

Figure 18:
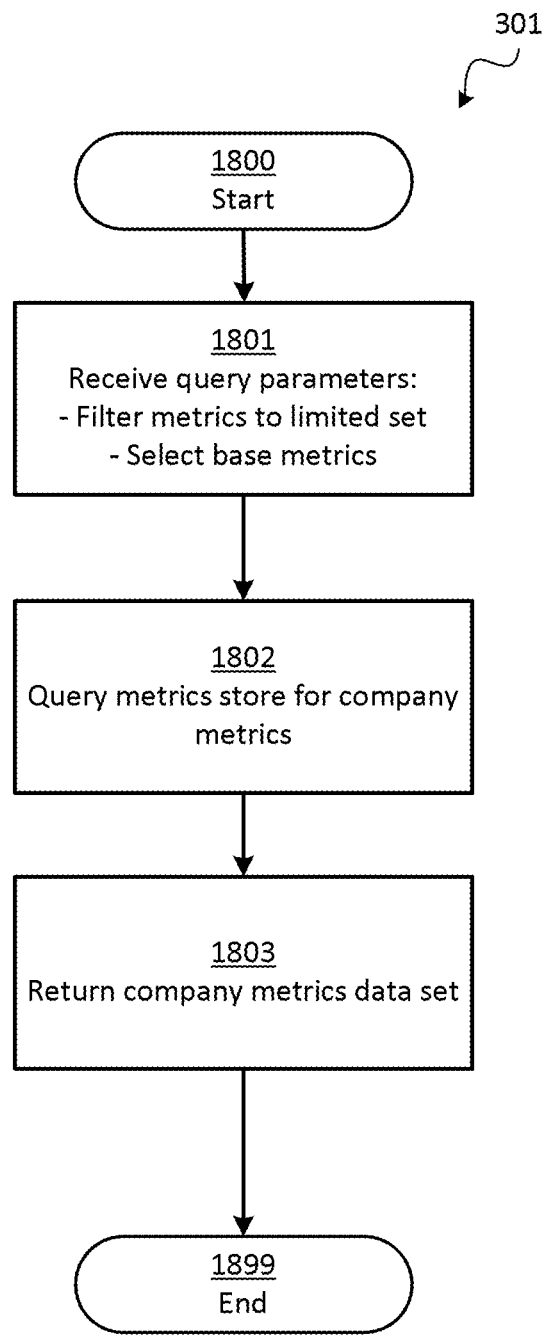
FIG. 18 is a flowchart depicting a method of obtaining data representing company metrics, according to one embodiment.

Referring also to FIG. 18, there is shown a flowchart depicting a method of obtaining data representing company metrics (step 301), according to one embodiment. The depicted steps can be performed, for example, by a data retrieval module 211, which may be implemented in software, hardware, or some combination thereof. Module 211 receives 1801 query parameters, which may include for example filtering metrics to a limited set, and selecting base metrics. Using these parameters, the module queries 1802 a metrics store (and/or other source) for company metrics (and/or any other data), and returns 1803 the company metrics data set.

Figure 19:
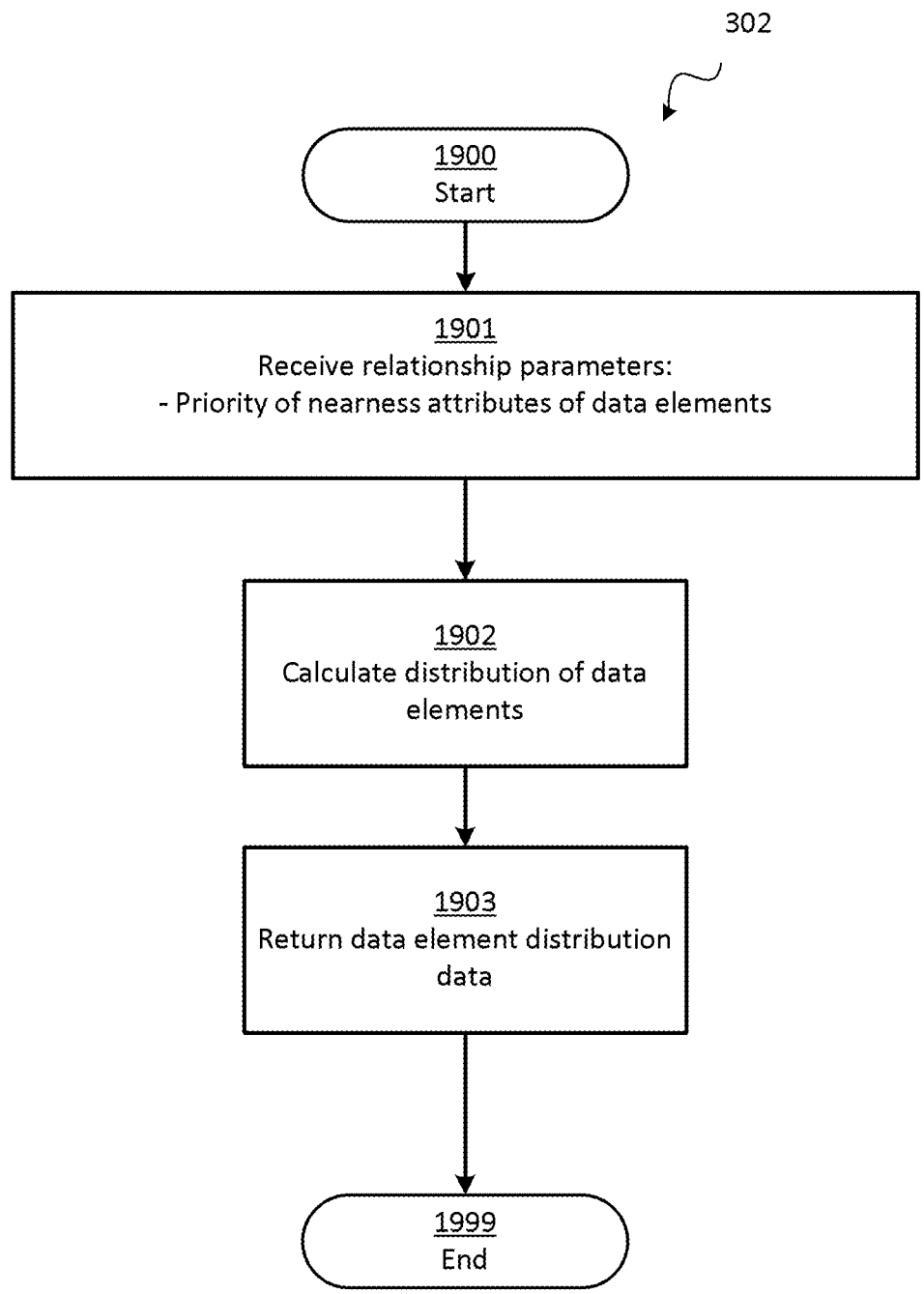
FIG. 19 is a flowchart depicting a method of establishing relationships among data elements, according to one embodiment.

Returning to FIG. 3, relationships among data elements are established 302, based for example on some predetermined hierarchy or based on data analysis. Referring also to FIG. 19, there is shown a flowchart depicting a method of establishing relationships among data elements (step 302), according to one embodiment. The depicted steps can be performed, for example, by relationship determination module 212, which may be implemented in software, hardware, or some combination thereof. Module 212 receives 1901 relationship parameters, including for example a priority of nearness attributes of data elements, which indicates which attributes of data elements should be considered most important in determining how to arrange data within map 204. Using this information, module 212 calculates 1902 a distribution of data elements, and returns 1903 this data element distribution for use by the system in establishing 303 map topography and placement of neighborhoods.

Returning to FIG. 3, relationships determined in step 302 can be used, for example, to specify geographical positioning of data representations on map 204: closely related data elements can be represented by visual elements on map 204 that are positioned proximate to one another. Thus, based on the relationships established in step 302, a topography for map 204 is established 303. In at least one embodiment, such topography can be based on a real-world geographic location, which is populated with various visual elements representing data elements; alternatively, the topography can be arbitrary, or can be based on a fictional geographic location. Data elements are associated with coordinate locations in map 204.

For example, the visualizations may be represented as a layer on top of a map of Utah. As the Sales category has the most visualizations as well as activity, Sales may be layered on top of Salt Lake City, since that is the most densely populated region of Utah.

In at least one embodiment, relationships among data elements, and resultant proximities used in generating the topography for map 204, can be determined using probabilistic methods, such as Stochastic Neighbor Embedding (SNE), which uses pairwise similarities and pairwise dissimilarities to indicate how similar each item is to each other item. Based on such analysis, items can be distributed in both high-dimensional space (i.e., within a neighborhood or geographic boundary) and low-dimensional space (i.e., between one neighborhood and another). One skilled in the art will recognize that any other suitable technique(s) can be used for determining relationships and for using such determined relationships in specifying geographic positioning of data representations on map 204.

In at least one embodiment, neighborhood distributions can be calculated per neighborhood boundary, rather than globally. For example, if Sales is the most measured activity within an enterprise, then in step 301, the system can limit the set of metrics to those viewed by employees in the Sales organization. Distributions of metrics within the corresponding neighborhood can then be calculated based on metric similarities, including, for example but not limited to, the name of the metric, the measures which the metric represent, the data sources from which the metrics are derived, and the like.

In at least one embodiment, a uniform distribution of data visualizations may be represented in a two-dimensional area, and/or using three-dimensional building representations. The map boundaries in either case may be determined based on the number of visualizations within a given category.

In at least one embodiment, the system determines relationships among neighborhoods and the data points within them based on at least two levels of information structure. A higher level determines how the neighborhoods themselves are related. For example, if a map contains neighborhoods for Finance, Human Resources, and Engineering, it is likely that the Finance and Human Resources neighborhoods would be close together, since both of these departments are concerned with company finances, while the Engineering neighborhood would be located farther away. The lower level determines how data points for visualizations are allocated within the neighborhoods themselves. For example, within the Finance neighborhood, the data points representing visualizations for expenses would be grouped closely together, and the data points representing visualizations for profits would also be grouped together elsewhere within the same neighborhood. Similarity algorithms, such as SNE, may be used to calculate neighborhood affinities as well as intra-neighborhood distributions.

In at least one embodiment, the system utilizes "desire paths" to determine adjustments to neighborhood and data point relationships over time. In such an embodiment, the system analyzes user metadata such as the number of visits to a visualization, the number of comments made on that visualization, the number of users who have added it as a Favorite, the number of times it has been hovered over, and/or the like, and makes adjustments to relationships accordingly. For example, if the system determines that managers from two different departments frequently visit data visualizations within the other manager's department, it may establish that there is a closer relationship between those departments than is currently shown in map 204, and it may move the neighborhoods closer together as a result.

Once the map topography has been established 303, the information environment map 204 is generated and stored 304. System 200 can generate map 204 so that it contains all of the available data, or some subset of the data. Map 204 can be generated at any desired level of detail, and can contain any number of visual features in addition to those that represent data elements. In at least one embodiment, map 204 is generated in three-dimensional space so as to allow a user to navigate freely in three dimensions when viewing and interacting with map 204. A representation of map 204 can be stored in database 107 and/or in any other suitable location for storing digital data. Any suitable compression scheme, encoding scheme, transmission scheme, and data format can be used for storing and retrieving map 204.

Once map 204 has been generated and stored, module 203 renders 305 an initial view of map 204. Such initial view can be rendered 305 so as to have a default position and zoom level; alternatively, position and zoom can be based on user preferences. Rendering 305 can be performed using any suitable techniques for generating a particular view of a scene from a particular angle and zoom level. Rendering 305 can be two-dimensional or three-dimensional, depending on the particular capabilities of system 200 and display screen 103.

A view of map 204 is then displayed 306 in two- or three-dimensional form, for example on display screen 103. Any suitable mechanism can be provided for depicting map 204, from a simple 2D overhead view to a sophisticated 3D-modeled fly-by with a moving virtual camera that may move automatically and/or be controlled by user 100.

User 100 can then interact with map 204 via input device 102. For example, user 100 can swipe, tap, drag, or perform any other gesture on a touch-sensitive screen to interact with map 204; alternatively, a pointing device can be used in connection with an onscreen cursor to click on, select, drag, or otherwise interact with map 204. In other embodiments, keyboard controls, speech controls, or other input mechanisms can be used. Input entered in these ways can be interpreted as commands to perform actions in connection the displayed map 204.

FIG. 3 depicts several examples of actions that can be performed in response to certain types of user input, although one skilled in the art will recognize that many other actions are possible. For example, in response to received user input 307 to dismiss map 204, map 204 is dismissed 312 and the method ends 399. In response to other types of user input 308 to interact with map 204, system updates and re-renders 309 the view of map 204 based on the user input.

In at least one embodiment, auxiliary visualizations and/or other content may be available in connection with locations on map 204. For example, a table, chart, graph, image, or other auxiliary visualizations can be associated with a particular location on map 204. User 100 can provide input to view such auxiliary visualizations, for example by tapping, hovering over, performing a press-hold or other gesture, or otherwise interacting with a location on map 204. In response to such action 310, auxiliary visualization(s) are displayed 311. Such auxiliary visualization(s) can be displayed in a manner that overlaps or is adjacent to map 204; alternatively, map 204 may be temporarily replaced on display screen 103 with the auxiliary visualization(s) and then restored when the auxiliary visualization(s) are dismissed. Alternatively, auxiliary visualization(s) can be shown in a different window on display screen 103, or on a different output device altogether, while map 204 continues to be displayed on the primary display screen 103 and/or window.

In yet another embodiment, auxiliary content may take non-visual form. For example, auxiliary content can be an audio explanation or text elaboration related to a particular location on map 204. In such an embodiment, such auxiliary content can be output using a suitable output device, in response to user input requesting such output for a particular map 204 location.

Information Environment Map

FIGS. 4 through 16 depict various examples of output that can be generated by the above-described system. One skilled in the art will recognize that these examples are merely provided for illustrative purposes, and that the described system can be implemented in ways that generate other types of output.

In at least one embodiment, functionally focused measures, such as those created by and primarily used within a department of an enterprise, determine the geographical locations of areas on map 204; relationships between areas are then determined and depicted based on such determined locations. Alternatively, other data attributes, such as measure name, may determine the geographical locations of areas on map 204.

In at least one embodiment, users 100 can set up neighborhoods on map 204 manually. Over time, the system can make adjustments to the placement of neighborhoods and/or other features that establish relationships among neighborhoods (such as roads). Such adjustments may be based, for example, on metadata such as the number of user visits to data visualizations, or the communications that reference data visualizations referenced in map 204. In other embodiments, the system can establish neighborhoods on map 204 automatically.

Any set of suitable visual metaphors can be used to represent various characteristics of the information. In at least one embodiment, for example, the height of a building (as depicted on map 204) may represent the number of metrics in a category, how it may be related to other categories, or how it relates to other metrics within the same category.

Relationships between disparate areas can be represented by shared borders, different colors, overlays, saturation, white space, and the like. Such relationships may be impacted by changing numbers of metrics. In at least one embodiment, users 100 may have the ability to change how disparate areas are distinguished (such as turning borders on or off, changing colors and saturation, and the like). In at least one embodiment, white space in regions is used to show the number of data visualizations that are available that have not yet been activated or made available for viewing (for example because the needed data has not yet been collected).

For example, database 107 may contain company metrics 111 that describe finances. Such metrics 111 can be broken down into subcategories, such as profits, expenses, and income. In addition, database 107 may also contain company metrics 111 for a marketing department. In information environment map 204, the finance category can be represented as a particular neighborhood at a particular geographic location, with individual sub-regions within that neighborhood representing profits, expenses, and income. Because marketing is related to profits, in this example marketing is represented at a neighborhood that shares a border with the profits sub-region of the finance neighborhood.

In at least one embodiment, changes to company metrics 111 over time may be reflected by changing features and elements of map 204. In this manner, map 204 may be used, for example, to show growth and shrinking of different departments. Traffic flow can represent further changes in company metrics 111, presented for example as overlays or changing attributes of city elements. For example, as an organization focuses on the functions of one department, the number of views for metrics created for that department may increase, causing a decrease in the activity in another department, or causing increased activity in closely related departments. The change in focus, and in this example, specifically, the change in views of metrics by specific people, can be represented by traffic flow from the metrics with decreased views toward metrics with increased views. In at least one embodiment, an animation player can be provided to allow user 100 to watch changes to information over time.

In at least one embodiment, various aspects of company metrics 111 (and/or other data) can be associated with specific entities, such as users, individuals, employees, departments, or the like. In at least one embodiment, user 100 can request that the system display activity associated with specific entities, for example, by checking boxes for those entities. For example, a map may have checkboxes for "CEO" and "CFO." A user could check the "CEO" box and then play the animation to see only the activity for the CEO over time. The user could also check both boxes and then play the animation to see the activity for both the CEO and CFO compared.

Figure 4:
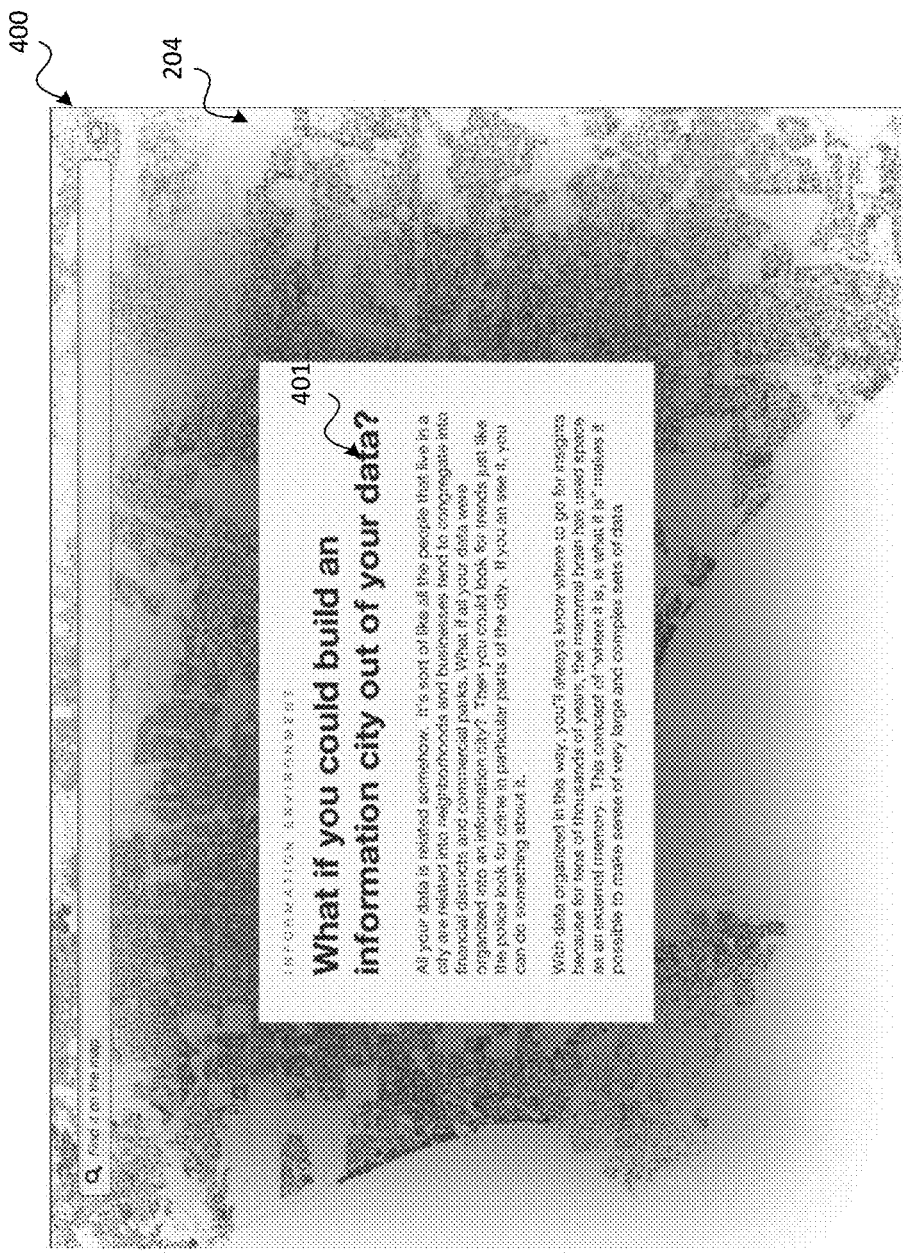
FIG. 4 depicts an example of a screen shot containing an introductory splash screen, according to one embodiment.

Referring now to FIG. 4, there is shown an example of a screen shot containing an introductory splash screen 400, according to one embodiment. In at least one embodiment, splash screen 400 includes an information environment map 204, here taking the form of a city map, with explanatory text 401 superimposed thereon.

Figure 5:
FIG. 5 depicts an example of an information environment map for a particular company, according to one embodiment.

Referring now to FIG. 5, there is shown an example of an information environment map 204 for a particular company, according to one embodiment. Different locations within map 204 correspond to different departments, individuals, teams, types of information, and/or the like.

Figure 6:
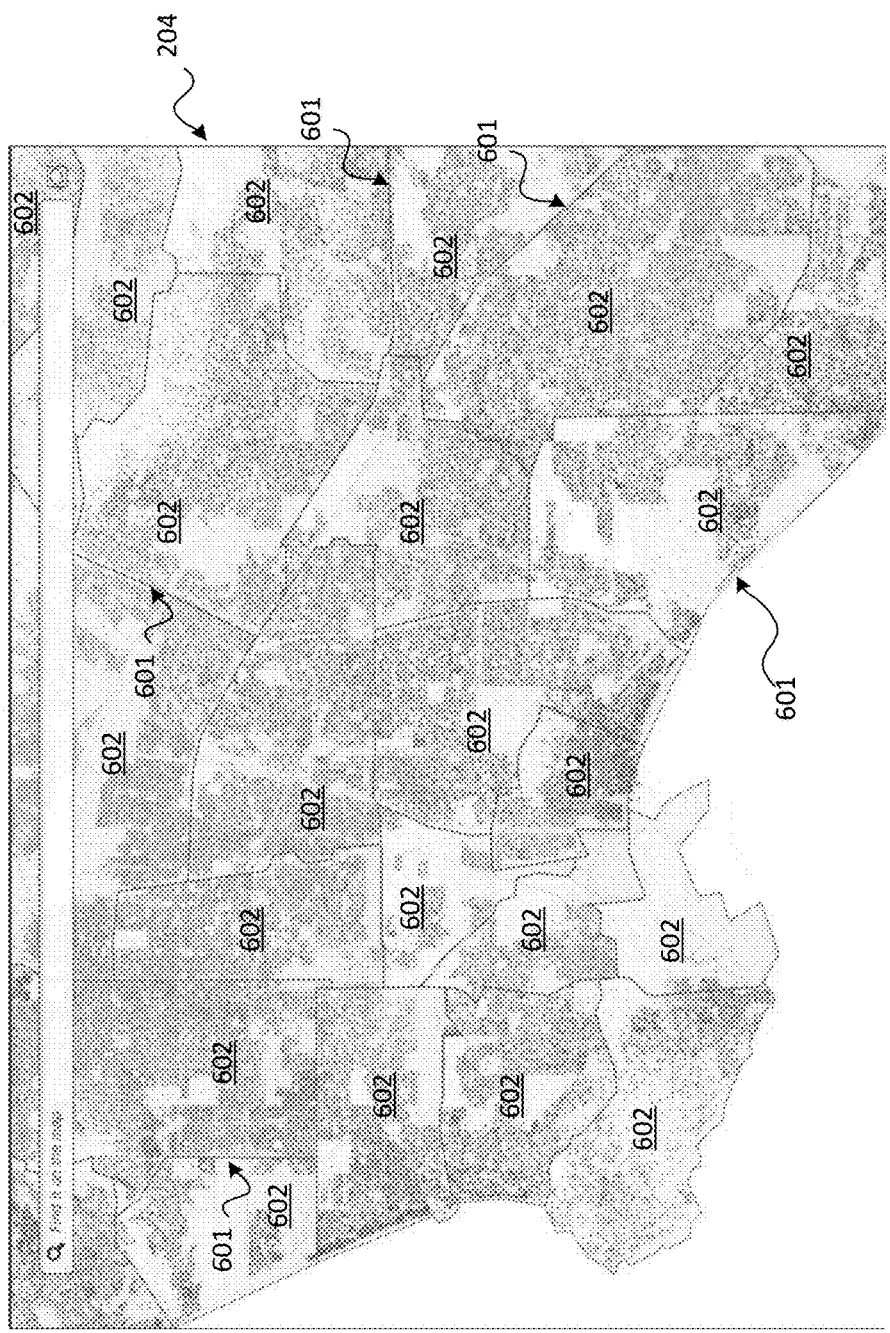
FIG. 6 depicts an example of an information environment map, wherein borders have been activated to more easily show distinctions between neighborhoods, according to one embodiment.

Referring now to FIG. 6, there is shown an example of an information environment map 204, wherein borders 601 have been activated to more easily show distinctions between neighborhoods 602, according to one embodiment. Dividing the area covered by map 204 into neighborhoods 602 can clarify associations between various locations of map 204 and different departments, individuals, teams, types of information, and/or the like. Neighborhoods 602 may be arbitrary, or they may correspond to actual physical neighborhoods in the real world.

Neighborhoods 602 may be labeled or unlabeled. In various embodiments, data labels may be displayed at all times, or at specific zoom levels but not at others, or in response to a trigger event such as mouse-over. Such data labels can indicate, for example, which department (or other entity) corresponds to a particular neighborhood 602, which visualizations are available for such department or entity, or the like. Any suitable labels can be used; for example, each neighborhood 602 in map 204 may be individually labeled with the name of its associated department or entity. More particularly, the data labels can indicate, for example, the total number of data visualizations in the department, the number of newly created visualizations or metrics, the number of total alerts, the number of unviewed alerts, the number of user comments, the number of unique individuals responsible for metrics within a neighborhood, the number of metrics for which user 100 is responsible within the neighborhood, and the like.

Figure 7:
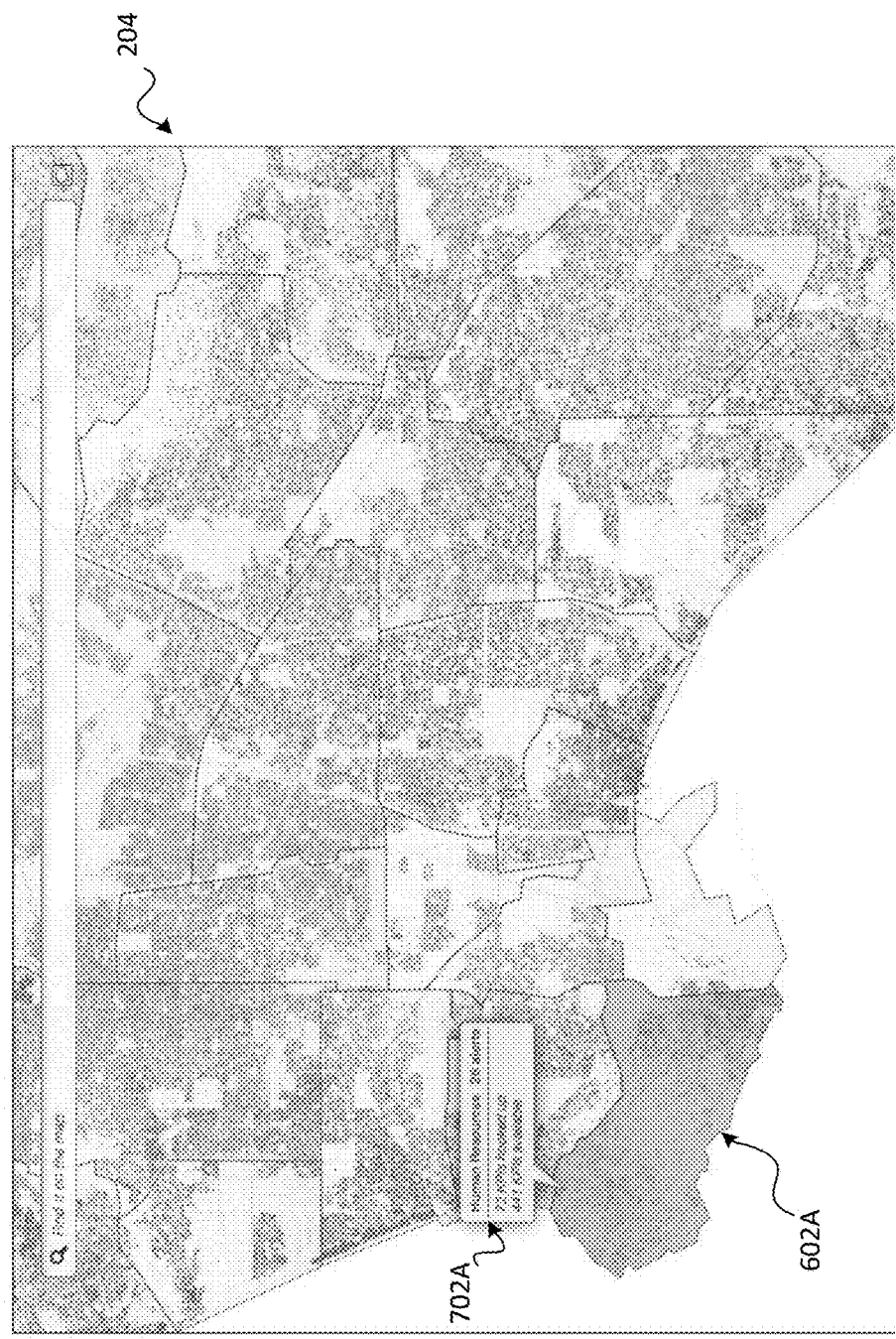
FIGS. 7 through 9 depict examples wherein the user is hovering over various neighborhoods on the map, causing various pop-up indicators to appear, according to one embodiment.
Figure 8:
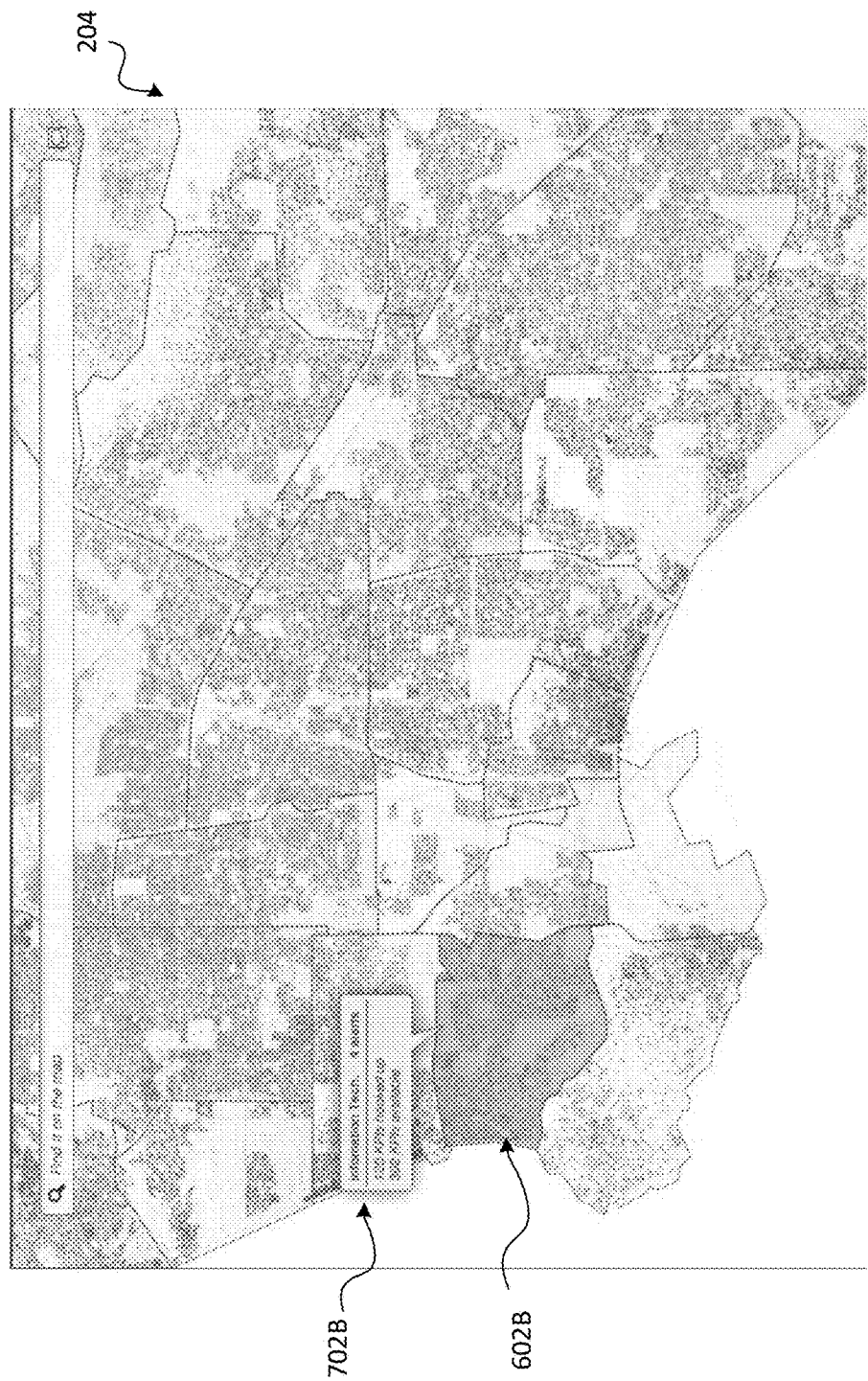
Figure 9:
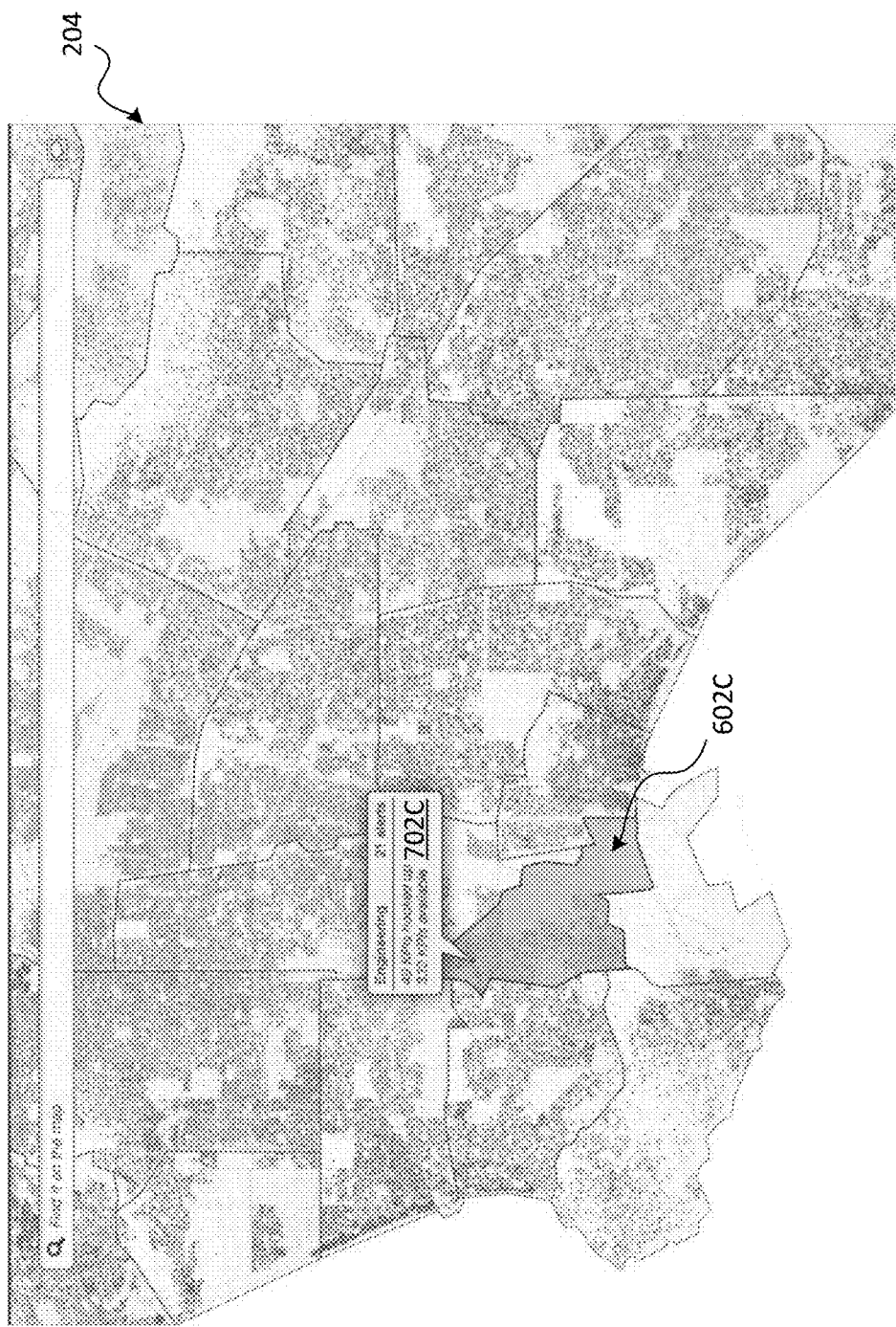

Referring now to FIGS. 7 through 9, there are shown examples wherein user 100 is hovering over various neighborhoods 602A, 602B, 602C on map 204, causing various pop-up indicators, such as labels 702A, 702B, 702C, respectively, to appear, according to one embodiment. Labels 702A, 702B, 702C contain information about the corresponding neighborhood 602A, 602B, 602C. In these examples, the information includes the name of the department, the number of alerts currently active concerning the department, the number of Key Performance Indicator visualizations (KPIs) available, and the number of such visualizations that are currently "hooked up" (connected to a data source, powered-up, or active). One skilled in the art will recognize that labels 702 can contain any suitable information associated with a corresponding neighborhood 602.

In at least one embodiment, user 100 can click on a neighborhood in map 204 to view the information associated with that neighborhood. For example, user 100 can be taken to a page specific to the department corresponding to the neighborhood; on that page, user 100 can view individual data visualizations, alerts, comments, and the like. In at least one embodiment, information can be organized hierarchically, so that when a user 100 clicks on a neighborhood, sub-regions within that neighborhood can be presented; the user can hover over such sub-regions to see labels, or can click on a sub-region to view information associated with the sub-region. Any number of levels can be provided in such a hierarchy.

As an example, user 100 logs in to the system and accesses the information environment map 204 for a company. The user hovers over a neighborhood 602 with the label "Sales." A pop-up indicator 702 appears, stating that there are 20 data visualizations for the sales neighborhood 602, along with two unread alerts. The user clicks on the sales neighborhood 602 to access a page in which the specific sales visualizations are shown, together with a link that allows the user to view the alerts.

Figure 17:
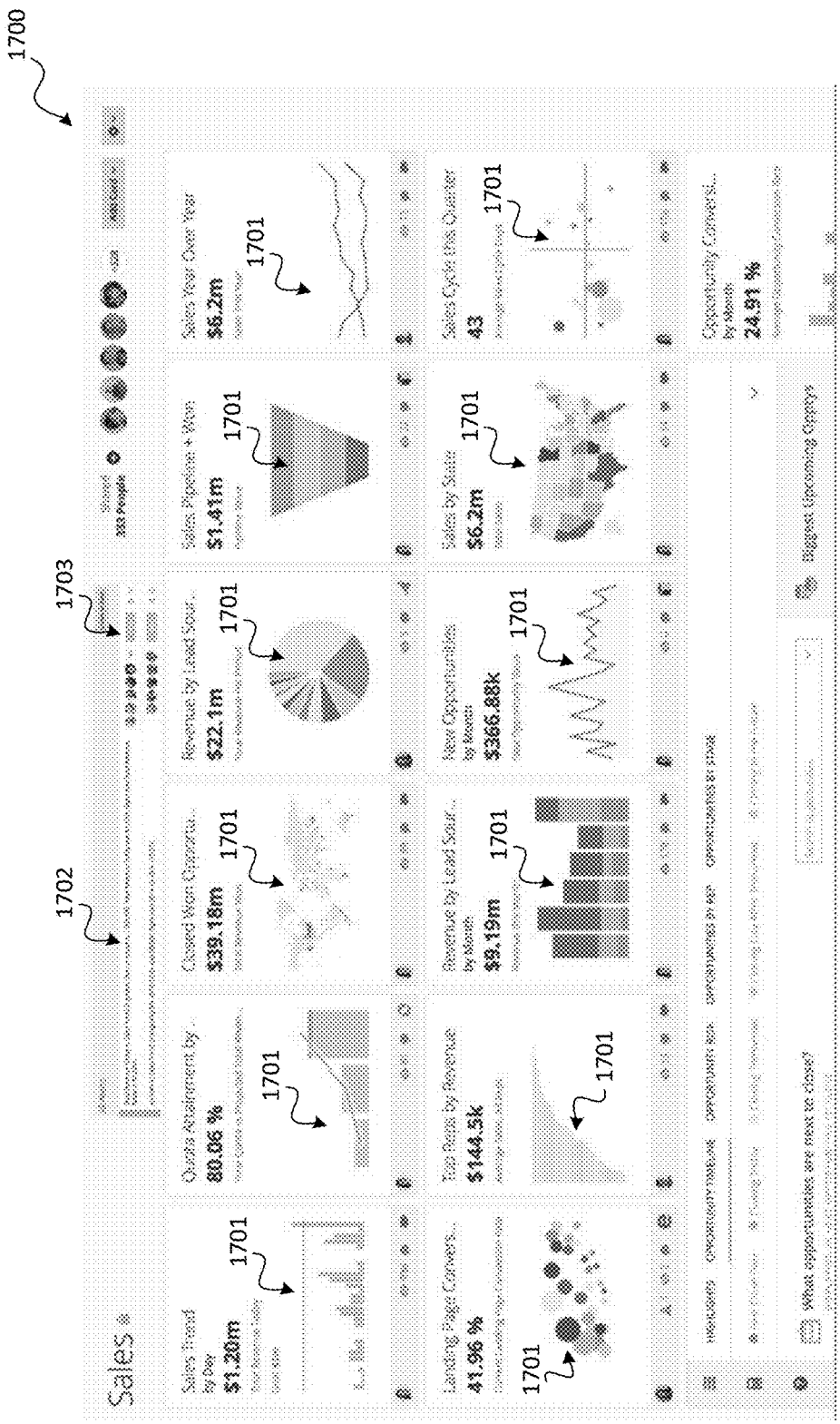
FIG. 17 depicts an example of a screen shot showing a number of sales visualizations, as well as a list of alerts, according to one embodiment.

Referring now to FIG. 17, there is shown an example of a screen shot 1700 showing a number of sales visualizations 1701, as well as a list of alerts 1702, according to one embodiment. A link 1703 is provided for each alert 1702, allowing the user to follow the alert and/or to get more information about it. In addition, in at least one embodiment, the user can click on any visualization 1701 to see an enlarged version of it and/or more information.

In at least one embodiment, a search feature can be provided in connection with information environment map 204. This feature allows user 100 to quickly locate and identify all areas of map 204 that correspond to certain criteria. In response to a search, user 100 can be guided to one or more neighborhood(s) 602 and/or visualization(s) through the use of highlighting, zooming in, and/or other visual cues. In at least one embodiment, heat map-type coloration can be used for highlighting, with the darkest coloring being used to indicate those areas that are the closest match, somewhat lighter coloring used to indicate areas that are the next closest, and so on. One skilled in the art will recognize that other visual mechanisms can be used.

Figure 10:
FIG. 10 depicts an example wherein the user has clicked in the search box at the top of the screen and has begun entering search terms, according to one embodiment.

Referring now to FIG. 10, there is shown an example wherein user 100 has clicked in search box 1001 at the top of the screen and has begun entering search terms, according to one embodiment.

Figure 11:
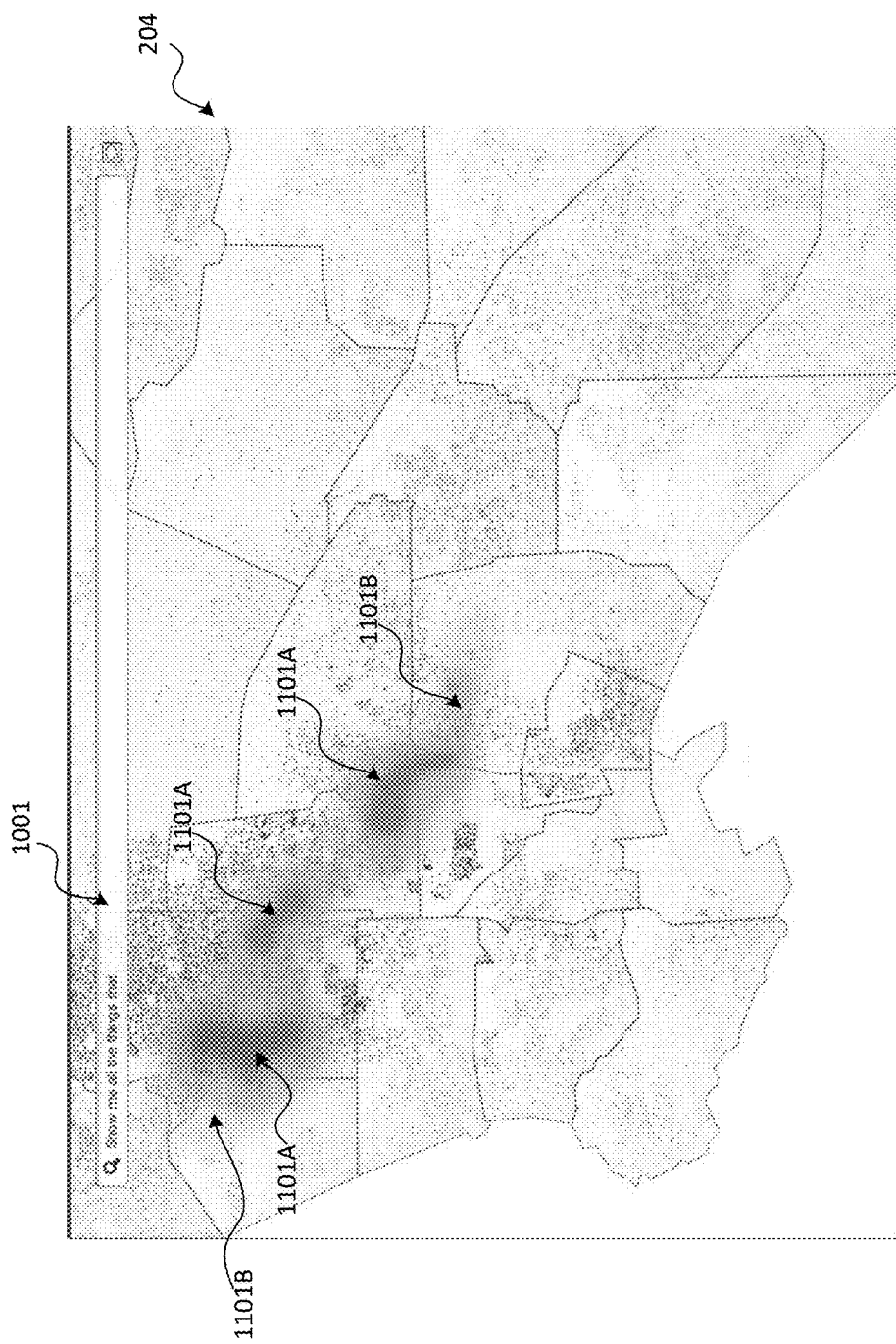
FIG. 11 depicts an example wherein areas of the map that correspond to the user's search criteria are shown using "heat map"-type coloration, in which the "hottest" areas are shown using the darkest coloration, according to one embodiment.

Referring now to FIG. 11, there is shown an example wherein areas of map 204 that correspond to user's 100 search criteria are shown using "heat map"-type coloration, in which the "hottest" areas 1101A (i.e., those that contain the closest matches to the entered search terms) are shown using the darkest coloration, and lighter coloring is used for those areas 1101B that are the next closest, according to one embodiment.

Figure 12:
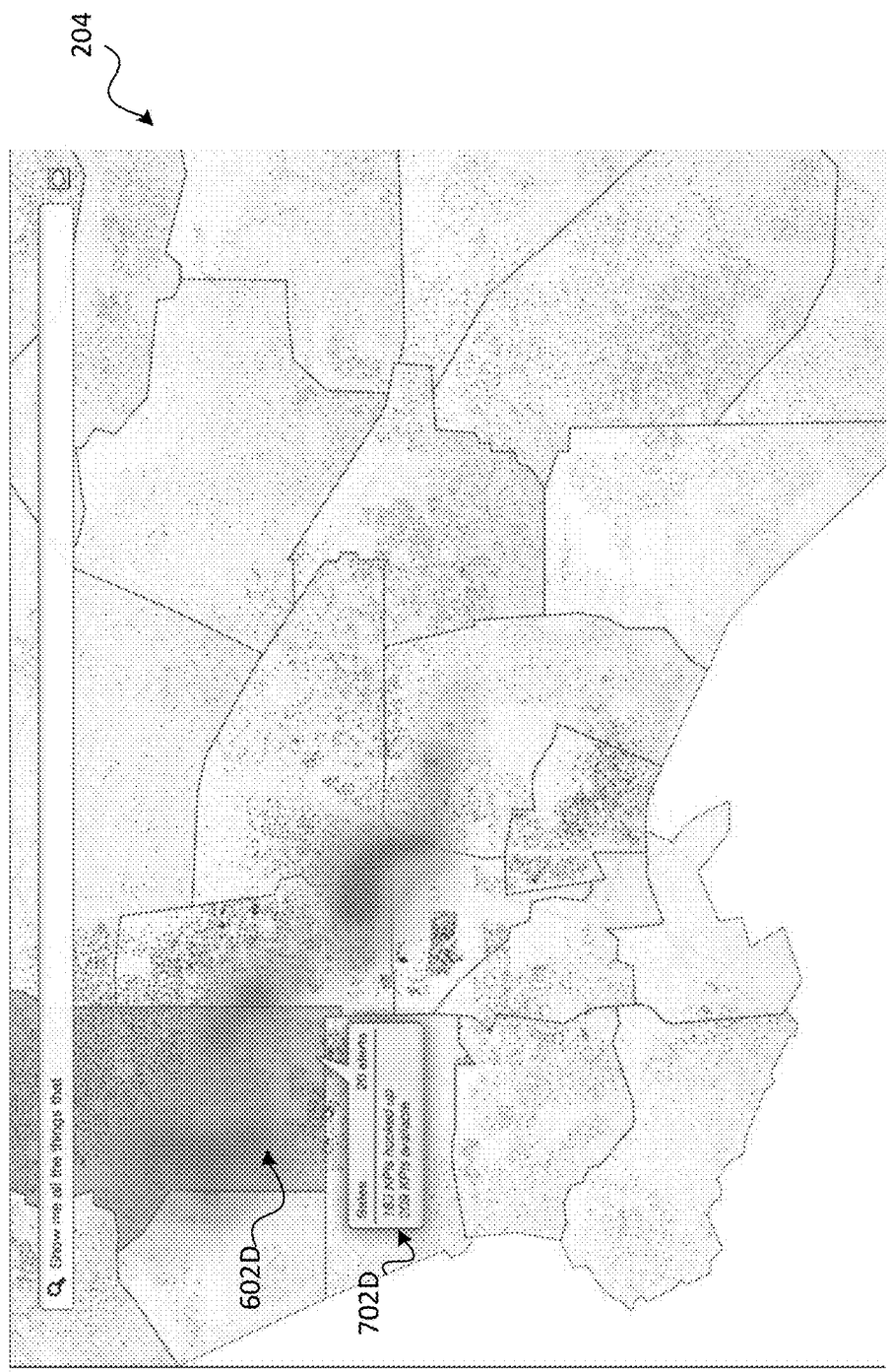
FIG. 12 depicts an example wherein the user is hovering over a neighborhood containing an area a high amount of highlighting, according to one embodiment.

Referring now to FIG. 12, there is shown an example wherein user 100 is hovering over neighborhood 602D, since it contains an area with a relatively high amount of highlighting. In response to user 100 hovering over neighborhood 602D, pop-up indicator 702D is shown, including information about neighborhood 602D, according to one embodiment.

In at least one embodiment, data visualizations may be grouped into certain categories. These categories may be determined automatically based on metadata such as the number of user visits, the number of comments made, the number of users who have added the visualization as a favorite, and/or the like. Alternatively, the categories may be custom-created by users. For example, user 100 may create a category of data visualizations called "CEO's Favorites" that consists of all data visualizations the company CEO has added as a favorite. In at least one embodiment, user 100 is presented with checkboxes for each category; checking or unchecking a box causes the data points for all visualizations in that category to be shown or hidden. In at least one embodiment, colors may be used to denote categories of data visualizations. Users 100 may have the option to assign colors to categories, or colors may be determined automatically.

In embodiments in which colors are used to denote categories of data visualizations, user 100 can be given the option to access a legend to help him or her distinguish among categories.

Figure 13:
FIGS. 13 and 14 depict examples wherein the user has zoomed in on the affected area, according to one embodiment.
Figure 14:

In at least one embodiment, user 100 can zoom in on a certain portion of the map to more easily view the data visualizations available within that portion. Zooming can be triggered by any suitable command, such as tapping a zoom button, performing a pinch gesture, inputting a keyboard command, moving a scroll wheel on a pointing device, and/or any other mechanism. Referring now to FIGS. 13 and 14, there are shown examples wherein user 100 has zoomed in on areas of map 204 that are shown as having the highest concentration of relevant visualizations, according to one embodiment. FIG. 13 depicts an example wherein user 100 has zoomed in slightly on the affected area to get a better look at the search results. In FIG. 14, user 100 has zoomed in even further. It is now much easier to see and interact with individual dots (data visualizations). The "i" indicator 1401 indicates an infographic (that is, a visualization made by grouping together data from other visualizations), and the circle 1402 indicates data visualizations being used to power the infographic. Any other indicators can be used in place of the "i" and the circle.

Figure 15:
FIGS. 15 and 16 depict examples wherein the user is hovering over locations within the affected area, in each case causing preview of a corresponding data visualization to appear, according to one embodiment.
Figure 16:
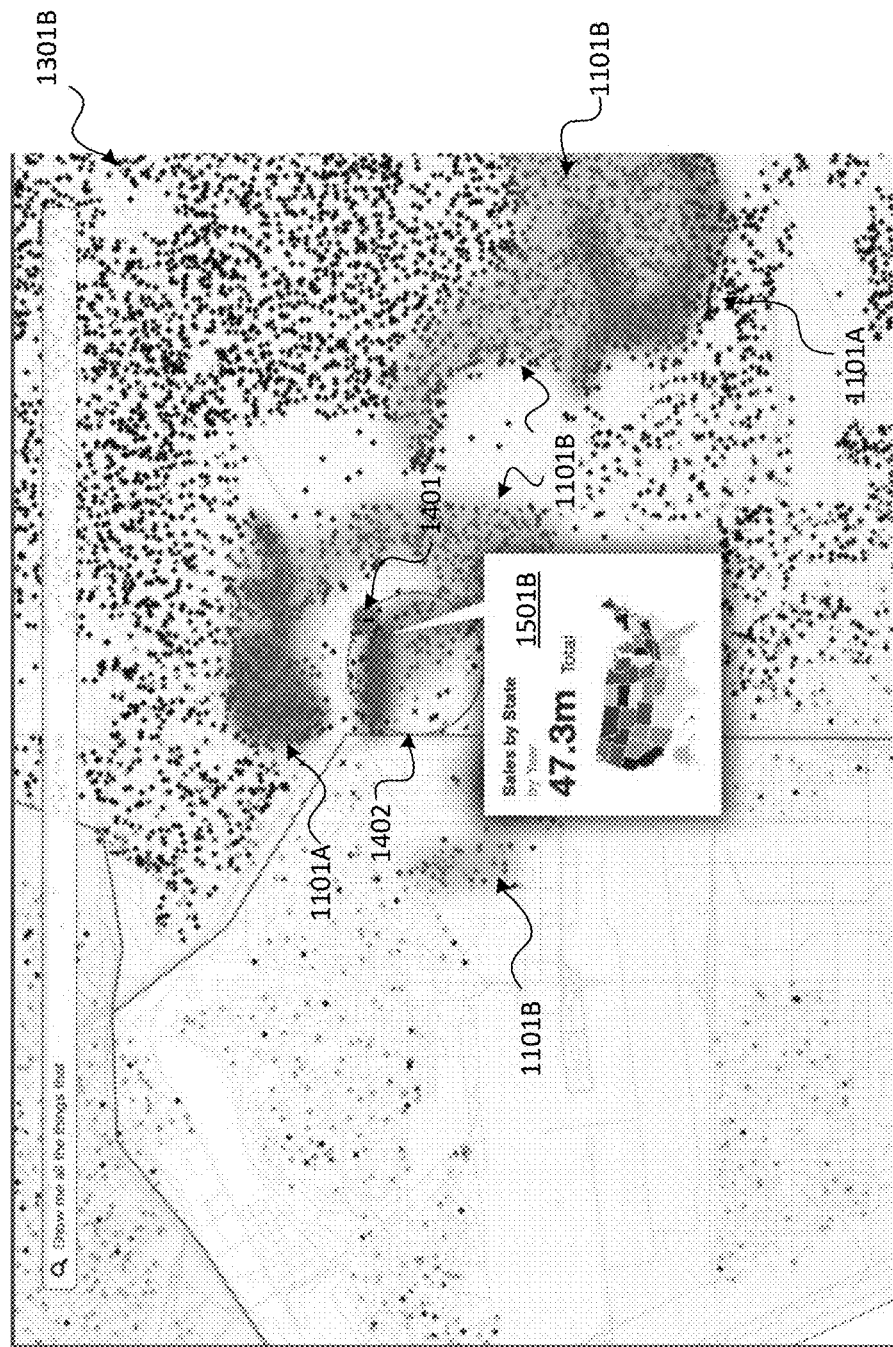

Referring now to FIGS. 15 and 16, there is shown examples wherein user 100 is hovering over locations within the affected area, in each case causing preview 1501A, 1501B of a corresponding data visualization to appear, according to one embodiment. In these examples, user 100 can click on the corresponding location to see the data visualization. As described above, the data visualization can be displayed in a manner that overlaps or is adjacent to map 204; alternatively, map 204 may be temporarily replaced on display screen 103 with the data visualization and then restored when the data visualization is dismissed.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A method for visualizing quantitative data comprising a plurality of data elements on a computing device display, the method comprising:
   determining relationships between respective data elements of the plurality of data elements, the determined relationships based on user interactions with visualizations of one or more of the respective data elements;
   assigning map locations to the respective data elements, such that a proximity of the map locations assigned to the respective data elements corresponds to the determined relationships between the respective data elements; and
   displaying a map visualization on the computing device display, the map visualization comprising graphical representations of the respective data elements arranged in accordance with the assigned map locations, such that a proximity of the graphical representations within the map visualization corresponds to the determined relationships between the respective data elements.

2. The method of claim 1, wherein displaying the graphical map visualization comprises transmitting electronic data to the computing device through an electronic communication network.

3. The method of claim 2, wherein the computing device is configured to display the graphical map visualization on the display of the computing device responsive to receiving the transmitted data.

4. The method of claim 1, wherein the graphical map visualization is displayed within a browser application operating on the computing device.

5. The method of claim 1, wherein the data elements comprise metrics derived from data of one or more data sources.

6. The method of claim 5, wherein the relationships between the respective data elements are determined based on the user interactions and one or more of names of the respective metrics, similarity of measures represented by the respective metrics, and similarity of data sources of the respective metrics.

7. The method of claim 1, wherein the relationships between the respective data elements are based on the user interactions and one or more of pairwise similarities between attributes of the respective data elements and pairwise dissimilarities between attributes of the respective data elements.

8. The method of claim 1, further comprising:
   monitoring user interactions with the graphical visualization at the computing device; and
   determining updated relationships between the respective data elements based on the monitored user interactions.

9. The method of claim 8, further comprising:
   modifying the map locations assigned to the respective data elements based on the updated relationships between the respective data elements; and
   generating an updated graphical map visualization of the data elements in which the graphical representations of the respective data elements are arranged in accordance with the modified map locations.

10. A non-transitory computer-readable storage medium comprising instructions configured to cause a computing device to perform operations for visualizing a plurality of data elements at a computing device, the operations comprising:
    determining relationships between respective data elements of the plurality of data elements, the determined relationships based on user accesses to visualizations of one or more of the plurality of data elements;
    generating a graphical representation of the data elements, wherein the graphical representation comprises a map visualization, and wherein generating the graphical representation comprises:
       representing the respective data elements as graphical features of the map visualization, and
       adapting the graphical features representing the respective data elements in accordance with the determined relationships between the respective data elements; and
    displaying the generated graphical representation of the data elements on a display of a computing device.

11. The non-transitory computer-readable storage medium of claim 10, wherein displaying the graphical visualization comprises transmitting electronic data to the computing device through an electronic communication network, and wherein the computing device is configured to present the graphical representation of the data elements on the display of the computing device in response to receiving the transmitted electronic data.

12. The non-transitory computer-readable storage medium of claim 10, wherein representing the data elements as graphical features of the map comprises associating data elements of the plurality of data elements with respective regions of the map, and wherein the regions are arranged within the map in accordance with the determined relationships between the respective data elements.

13. The non-transitory computer-readable storage medium of claim 12, wherein:
    the determined relationships between the respective data elements are based on the user accesses and a degree to which the respective data elements are related, and
    a proximity of the regions associated with the respective data elements within the map correspond to the determined relationships between the respective data elements.

14. The non-transitory computer-readable storage medium of claim 10, the operations further comprising determining relationships between the respective data elements for each zoom level of two or more zoom levels.

15. The non-transitory computer-readable storage medium of claim 10, the operations further comprising:
    monitoring user interactions with the graphical representation of the data elements; and
    displaying an animation indicating one or more of the monitored user interactions.

16. The non-transitory computer-readable storage medium of claim 15, wherein the animation indicates the one or more monitored user interactions as a function of time.

17. The non-transitory computer-readable storage medium of claim 15, wherein the animation indicates monitored user interactions of a particular user.

18. An apparatus for visualizing a plurality of data elements at a computing device, the apparatus comprising:
    computer-readable instructions maintained within a non-transitory storage medium, the instructions adapted to configure a computing device processor to:
       determine relationships between respective data elements of the plurality of data elements, the relationships determined, at least in part, based on user interactions with visualizations of one or more of the data elements,
       arrange representations of the data elements within a map visualization, wherein the representations are arranged in accordance with the determined relationships between the respective data elements, and cause the map visualization to be rendered on a display of the computing device.

19. The apparatus of claim 18, wherein:

the determined relationships between the respective data elements comprise relationships between the respective data elements for each visualization zoom level of two or more visualization zoom levels, and the representations of the data elements are arranged within the map visualization in accordance with the determined relationships for a selected visualization zoom level of the two or more visualization zoom levels.

20. The apparatus of claim 19, wherein:

the processor is further configured to generate a graphical representation of a search result pertaining to one or more of the plurality of data elements, and the graphical representation of the search result is configured to overlay one or more of the representations of the data elements within the map visualization.

* * * * *